MAGNETIC SINGLE WALL DOMAIN PROPAGATION DEVICE

Filed Aug. 12, 1968 3 Sheets-Sheet 1

INVENTORS A. H. BOBECK
E. DELLA TORRE
BY Herbert M. Shapiro
ATTORNEY

United States Patent Office 3,523,286
Patented Aug. 4, 1970

3,523,286

MAGNETIC SINGLE WALL DOMAIN PROPAGATION DEVICE

Andrew H. Bobeck, Chatham, and Edward Della Torre, Plainfield, N.J., assignors to Bell Telephone Laboratories, Incorporated, Murray Hill, N.J., a corporation of New York Filed Aug. 12, 1968, Ser. No. 752,069
Int. Cl. G11c *19/00*
U.S. Cl. 340—174 11 Claims

ABSTRACT OF THE DISCLOSURE

The propagation of single wall domains along a selected one of two intersecting propagation channels may be made to depend on the size of the domain at the intersection. Embodiments are described where domain propagation is carried out with alternation of domain size and, alternatively, with a constant domain size.

FIELD OF THE INVENTION

This invention relates information processing by means of magnetic domain propagation devices and more particularly to devices in which single wall domains are moved in a magnetic propagation medium.

BACKGROUND OF THE INVENTION

A single wall domain is a magnetic domain which is bounded by a single domain wall closing upon itself and having a geometry independent of the boundary of the sheet in which such a domain is moved. The domain conveniently assumes the shape of a circle in the plane of the sheet and has a stable diameter determined by the material parameters. A bias field of a polarity to contract domains insures movement of domains as stable entities. The Bell System Technical Journal, vol. XLVI, No. 8, October 1967, at pp. 1901 et seq., describes the propagation of single wall domains in a propagation medium such as a rare earth orthoferrite.

The movement of domains is accomplished normally by generating consecutively offset localized fields (actually field gradients) of a polarity to attract domains. In this manner, a domain follows the consecutive attracting fields from input to output positions in the sheet. A three-phase propagation operation provides the directionality along a selected propagation path in a manner consistent with the teaching of the prior art.

The propagation wiring pattern assumes a geometry dictated by the material in which the domains are moved. A typical material is a rare earth orthoferrite. These materials have preferred directions of magnetization substantially normal to the plane of the sheet. If we adopt the convention that a sheet is saturated magnetically in a negative direction normal to the plane of the sheet, the magnetization of a single wall domain is in the other or positive direction normal to the plane of the sheet. The domain then may be represented as an encircled plus sign where the circle represents the single domain wall. The propagation wiring pattern is conveniently in the form of consecutively offset closed loops to correspond to the circular geometry of the domain.

The geometry of the propagation wiring pattern determines the packing density in a magnetic sheet in which single wall domains are moved. Current requirements for generating propagation fields dictate minimum cross-sectional areas for the propagation conductors. When next adjacent conductors are closely spaced, however, the thickness of the conductors cannot be made disproportionately large. Rather, as the thickness of the conductors is increased, the width also increases thus reducing the spacing between conductors at the risk of causing short circuits therebetween. Consequently, the width of the conductors and the spacings between them are made relatively large to accommodate the desired current. Further, the loop configuration requires a minimum dimension along the axis of propagation dictated by the width of two conductors plus the opening encompassed by the loop for each domain position. Photoresist techniques permit depositions having dimensions in the submil range with reproducible results.

The minimum domain position size, of course, is several times larger than that range because of the loop pattern. Also not all domain positions can be occupied simultaneously because the three-phase propagation cycle which provides directionality along a propagation channel requires some unoccupied domain positions as to interactions between domains. Thus, as much as about 10 mils is allocated for each bit location. Yet domains in the micron size have been observed. A relatively high packing density then could be realized if the constraint of requiring discrete propagation conductors is removed.

But it is difficult to achieve selectivity in domain movement and to realize logic operations with single wall domains in the absence of discrete propagation conductors. Copending application Ser. No. 657,877, filed Aug. 2, 1967, for A. H. Bobeck, H. E. D. Scovil, and W. Shockley, for example, describes a number of logic operations employing single wall domains. The operations employ discrete propagation conductors for effecting domain motion on a selective basis and turn to account interactions between neighboring domains.

An object of the present invention is to provide a single wall domain propagation device in which logic operations can be achieved even when discrete propagation conductors are absent.

Copending application Ser. No. 710,031, filed Mar. 4, 1968, for A. H. Bobeck and R. F. Fischer describes the movement of single wall domains in a sheet of material having a suitable uniaxial anisotropy. An asymmetrical soft magnetic overlay defines a unidirectional propagation channel in the sheet for domains alternately expanded and contracted.

BRIEF DESCRIPTION OF THE INVENTION

In accordance with this invention, a single wall domain can be made to propagate along one of a plurality of channels depending on the size of a domain in an intersection between prospective channels.

In one embodiment of this invention, an arrangement of propagation channels is defined by asymmetrical overlays of Permalloy on a sheet of a rare earth orthoferrite. A domain alternated between 1.5 and about 2.0 times the collapse diameter and propagating along an input channel is routed to a first or second exit channel depending on the size of the domain at the intersection. The term "collapse diameter" designates the smallest diameter to which a domain can be reduced in a material before the domain collapses spontaneously.

In another embodiment, a circular propagation channel is defined by a Permalloy overlay. In addition, a plurality of channels are defined which radiate from the periphery of the circular channel. A domain, having a constant diameter of 1.5 times the collapse diameter propagates around the circular channel in response to a field (transverse) rotating in the plane of the sheet in which the channel is defined. When the domain diameter is increased to about 2.5 times the collapse diameter in a position corresponding to an entrance or input position in a radial channel, the domain propagates in that radial channel in response to further rotation of the transverse field.

DETAILED DESCRIPTION

Figure 1:
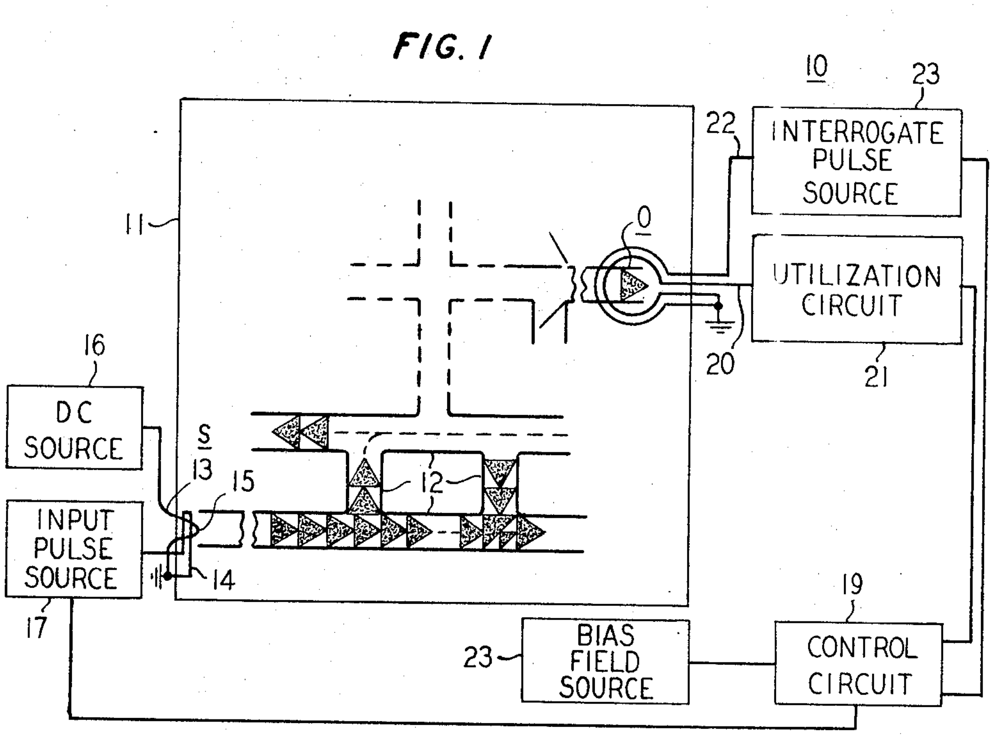
FIG. 1 is a schematic illustration of an arrangement in accordance with this invention.

FIG. 1 shows an arrangement 10 in accordance with this invention. The arrangement comprises a sheet 11 of a material in which single wall domains can be propagated.

A plurality of interconnected unidirectional channels 12 are defined in sheet 11 by overlay patterns of a soft magnetic material such as Permalloy. The channels are shown, illustratively, originating from a source of single wall domains S and terminating at an output position O. It is to be understood that a number of sources and outputs can be provided but only an illustrative source and output are shown and described for simplicity.

The illustrative source S comprises a domain 13 of positive magnetization for the convention adopted and a hairpin conductor 14 which, when pulsed, severs from that domain a single wall domain for propagation. Domain 13 is outlined by a conductor 15 connected between a D.C. source 16 for maintaining its geometry as described in copending application Ser. No. 579,931, filed Sept. 16, 1966 now Pat. No. 3,460,116, for A. H. Bobeck, U. F. Gianola, R. C. Sherwood and W. Shockley. Conductor 14 is connected between an input pulse source 17 and ground. Input pulse source 17 is connected to control circuit 19.

The illustrative output position O is defined by a loop conductor 20 which encompasses a terminal position, in a propagation channel, which may be occupied by a domain. Conductor 20 is connected between a utilization circuit 21 and ground. Another loop conductor 22 also encompasses the position encompassed by conductor 20. Conductor 22 is connected between an interrogate pulse source 23 and ground. Source 20 applies a pulse to conductor 22 to collapse any domain which occupies the position encompassed thereby. If a domain is present, a pulse is applied, via conductor 20, to utilization circuit 21 indicating the presence of a binary "1." Of course, if a domain were absent, only a negligible pulse is applied indicating a binary "0." Source 23 and circuit 21 are connected to control circuit 19 to this end.

The interconnected channels 12 of FIG. 1 may be seen to comprise essentially right angle intersections interconnected to provide a plurality of propagation channels. The flexibility of such an arrangement and the desirability of the realization thereof are well understood by those skilled in the art.

Figure 2A:
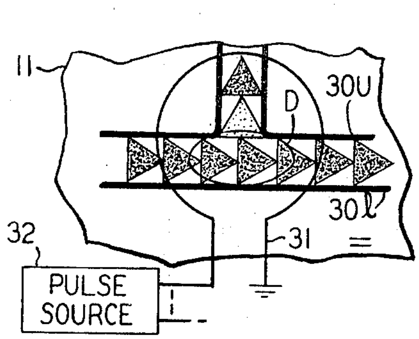
FIGS. 2A, 2B, 2C, and 2D, FIGS. 3A, 3B, 3C, and 3D, and FIG. 4 are illustrations of portions of the arrangements of FIG. 1.

The understanding of the operation of the illustrative arrangement, however, may be facilitated by an examination of a single intersection. FIG. 2A shows a portion of sheet 11 having a single intersection thereon. The intersection is viewed so that a single entrance channel approaches from the left whereas two (perpendicular) channels exit from the right and upward. The operation is discussed in terms of a single wall domain approaching from the left with particular attention being given to the mechanism for determining the choice of exit channels.

It is important to understand at the outset that the movement of domains in the arrangement of FIG. 1 is illustratively by virtue of an alternation in the size of the domains determined by variation in a bias field generated substantially uniformly in sheet 11. The bias field is essentially normal to sheet 11 as viewed in FIG. 1 and directed away from the viewer in accordance with the adopted convention. The polarity of this bias field then is to contract the domains in sheet 11, permitting an expansion of domains when the bias field intensity is reduced. Variations in the bias field thus cause the domains to expand and contract alternatively and the asymmetrical shape of the Permalloy overlay resolves this alternative expansion and contraction into a net displacement in the channel. The movement of domains in this manner is disclosed in the aforementioned copending application of A. H. Bobeck and R. C. Fischer. Bias field source 23 is represented as a block so numbered and may comprise, for example, a coil (not shown) in the plane of sheet 11 and encompassing that sheet to provide the requisite bias field when driven. Source 23 is connected to control circuit 19.

An exit channel for a single wall domain at a selected intersection is determined by the size of a domain at the intersection and the relationship between that size and the geometry of the Permalloy wedges which comprise the overlay pattern. A convenient reference quantity for measurement of the various elements herein is the diameter at which a single wall domain collapses spontaneously in sheet 11. The collapse diameter is a function of the material parameters and the bias field and can be measured directly by means of the Faraday effect. The collapse diameter is designated $d$ and various measurements herein are provided in terms of multiples of $d$. Each channel in FIG. 2A accordingly is $1.5d$ wide. That is to say, the boundaries of the channel are defined by upper and lower Permalloy strips $30\mu$ and $30l$ spaced $1.5d$ apart. The Permalloy wedges starting from left to right and following the horizontal exit channel as viewed in FIG. 2A are all about $2d$ long at the apex of the triangle measured in the direction of propagation, whereas from left to right following upward along the vertical exit channel the wedges are again all $2d$ long; but the first triangular shape of the vertical channel is of reduced thickness as is discussed further hereinafter.

A domain D, having a diameter of $1.5d$ and entering the intersection of FIG. 2A, follows the vertical exit channel for subsequent bias alternations if the local bias field at the intersection is reduced to increase the domain diameter when the domain is in the intersection. A domain in the arrangement of FIG. 2A does not increase in size uniformly because it is confined by the Permalloy strips. Consequently, it is inappropriate to describe the increase in size in terms of multiples of the collapse diameter. Only three levels of bias are employed herein, however, and the size of the domain is easily described in terms of low, medium, and high bias fields which control that size. Therefore, the vertical exit channel is selected for a domain alternated in size by alternating medium and high bias fields, by reducing the bias field to a low value when the domain is in the intersection. The horizontal channel is selected for propagation when the local bias field is retained at the medium bias level. Typical bias values are $13\pm3$ oersteds.

A conductor loop 31 shown in FIG. 2A connected between a pulse source 32 and ground may be used to alter the bias field locally at a selected intersection. The horizontal channel of FIG. 2A may function as a shift register and coded information may be applied to conductor 31 to shunt selected domains, representative of information, into the vertical exit channel for synchronous propagation. In this manner, a two rail shift register may be provided.

Figure 2B:
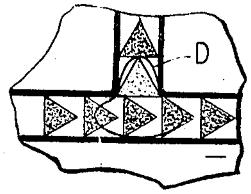
Figure 2C:
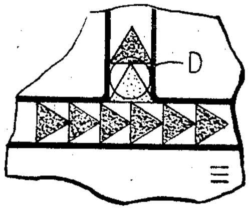
Figure 2D:
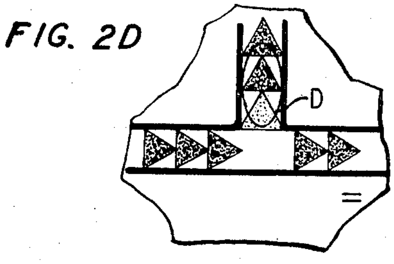
Figure 3B:
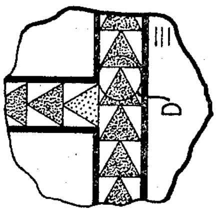
Figure 3D:
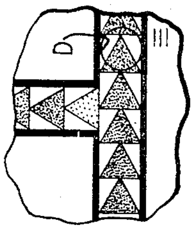
Figure 3A:
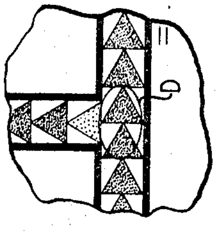
Figure 3C:
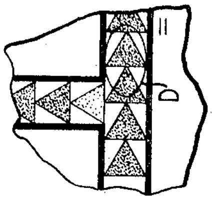

The movement of an illustrative domain through an intersection is demonstrated in connection with FIGS. 2A, 2B, 2C, and 2D. FIG. 2A shows domain D in the presence of a medium bias field while FIG. 2B shows the domain in the presence of a next consecutive low field. The medium field is represented by the double minus sign in FIG. 2A and the low field is represented by the single minus sign in FIG. 2B. If the bias field generated by source 23 is changed, by the presence of a current in conductor 31, to a low level when the domain is in the position shown in FIG. 2A, the domain moves upward into the position shown in FIG. 2B. A high field is represented by the triple minus sign in FIG. 2C. Further alternations between high and medium levels of bias field after a low field is generated move the domain in the vertical exit channel to the next consecutive positions shown by the circles D in FIGS. 2C and 2D. If current in conductor 31 of FIG. 2A is absent, thus failing to generate a field of an amplitude and polarity to reduce appropriately the field generated by source 23 of FIG. 1, domain D is moved to next consecutive positions in the horizontal exit channel of FIG. 2A as shown by the circles D in FIGS. 3A through 3D in response to further alternations of the bias field between medium and high levels.

It is convenient for the bottom Permalloy wedge of the vertical channel as shown in FIG. 2A to be generally less attracting to domains to insure proper channel selection. This is usually implemented by making the wedge thinner or by aperturing the wedge to reduce the amount of material there as indicated by the different shading in the figure.

Figure 4:
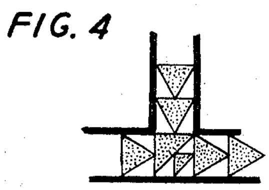

Of course two channels may converge into one just as one may diverge into two. The former is commonly known as fan-in while the latter is known as fanout. FIG. 1 comprises both types of intersections as shown, the fan-in arrangement being shown in detail in FIG. 4. Again the channels in FIG. 4 are 1.5*d* wide. The Permalloy geometry of wedges permits convergence from either a vertical or horizontal entrance channel into a single horizontal exit channel in response to domain alternation. No unusual change in domain size is required for fan-in, but the fan-in implementation permits channel selection in accordance with this invention to be generalized into a quite flexible information processing arrangement as is discussed further hereinafter.

FIG. 4 shows the wedge geometry specifically for convergence (fan-in) downward along the vertical channel or to the right along the horizontal channel with a domain alternated by high and medium bias fields. The wedges from left to right along the horizontal channel are 2.0*d*, 2.0*d* right angle, 1*d* right angle, 2.0*d*, and 2.0*d*. The vertical channel has consecutive wedges each 2.0*d*.

Figure 5:
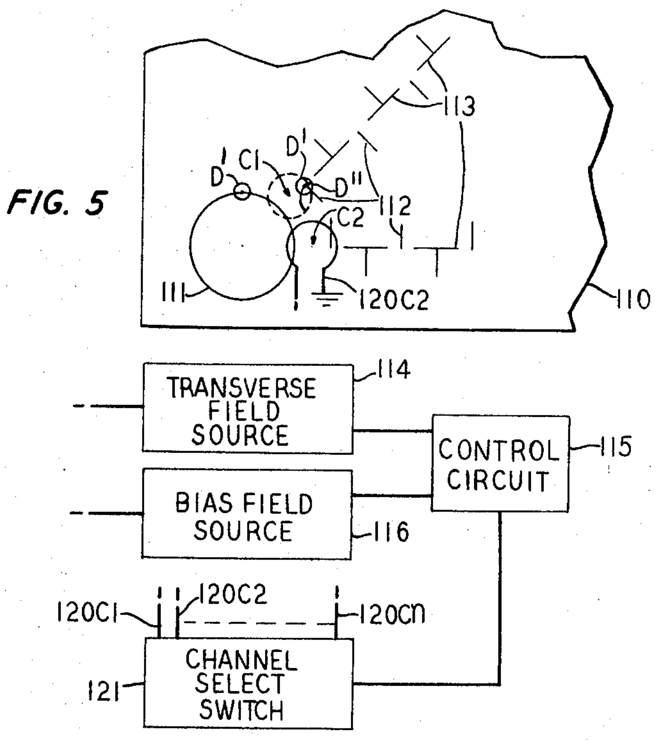
FIG. 5 and FIGS. 6A through 6D are diagrams of portions of an alternative arrangement in accordance with this invention.

FIG. 5 shows an alternative arrangement where the channel selected for domain propagation, again, is determined by a change in domain diameter at an intersection. Propagation of a domain along a channel, however, does not require alternate contraction and expansion of domains in this embodiment. Specifically, FIG. 5 shows a portion of a sheet 110 of material in which single wall domains can be moved. A Permalloy disk 111 is deposited on the surface of sheet 110 along with radial arrangements of bar and T Permalloy geometries 112 and 113 respectively.

A domain D′ having a diameter of 1.5*d* for example moves in sheet 110 about the periphery of disk 111 in response to a transverse field rotating in the plane of sheet 111. Operation of this type is disclosed in copending application Ser. No. 732,644, filed May 28, 1968 for A. H. Bobeck, E. Della Torre, and H. E. D. Scovil. Propagation of domains along a bar and T channel is disclosed in copending application Ser. No. 732,705, filed May 28, 1968 for A. H. Bobeck. A rotating transverse field is provided conveniently by two pairs of Helmholtz coils perpendicular to one another (pair) and oriented normal to sheet 110. The pairs of coils are driven sinusoidally and out of phase with one another in a well understood manner to generate a transverse field which rotates in the desired plane. Magnetic pole distributions in the Permalloy patterns change in a manner to attract domains along the various channels. The Helmholtz coils are not shown. However, a transverse field generating source is represented by a block 114 in FIG. 5. Source 114 is connected to a control circuit 115.

The diameter of domain D′ is determined by the intensity of a bias field of a polarity to contract domains. The presence of such a bias field is represented by bias field source 116 connected to control circuit 115. A reduction in the intensity of the bias field permits domain D′ to enlarge. If that bias field is reduced when domain D′ is in a position C1, domain D′ expands as indicated by the broken circle D″ in FIG. 5. Subsequent increase in the intensity of the bias field reduces the size of the domain in a position for propagation along the radial channel at C1.

Figure 6A:
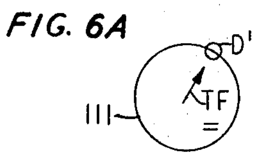
Figure 6B:
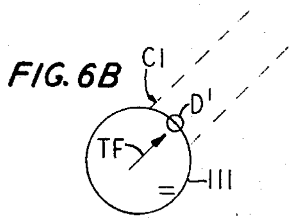
Figure 6C:
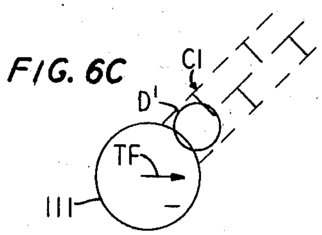
Figure 6D:
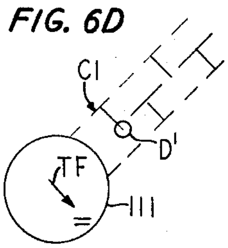

The sequence of operations for the arrangement of FIG. 5 is shown in FIGS. 6A–6D. An arrow TF indicates the orientations of the rotating transverse field in each figure and is shown rotating clockwise as viewed. When the field (TF) rotates to the position C1 of a radial channel, the bias field is decreased permitting the domain to expand from 1.5*d* to 2.5*d*. The normal intensity of the bias field is indicated by the double minus sign in FIG. 6A and is shown decreased as indicated by the single minus sign in FIG. 6C. FIG. 6C also shows the domain expanded to 2.5*d* to couple a Permalloy bar. When the bias field is next increased, the domain remains coupled to that bar as shown in FIG. 6D. In response to continuing clockwise rotation of the transverse field, domain D′ advances along channel C1 rather than along the periphery of disk 111. Such operation is insured by the existence of stronger pole concentrations in the radial channels as compared to the poles on disk 111 due to the geometry of the elements constituting the radial channels.

Had the bias field been decreased when domain D′ was in the position C2 of FIG. 5, the sequence of FIGS. 6A–6D would initiate propagation in channel C2 of FIG. 5.

Of course, the bias field need not be decreased uniformly throughout sheet 111 to achieve channel selection. Actually a conducting loop may be employed at the intersection of a radial channel and disk 111 to reduce the bias field locally in a manner similar to that described in connection with FIG. 2A. Such an implementation is indicated by a conductor 120C2 connected between a channel select switch 121 in FIG. 5 and ground. Alternatively, a single conducting loop encompassing all of disk 111 and all the intersections may be appropriately pulsed to this end.

It should be understood that regardless of the mode of domain propagation, either with alternation of domain diameter or with constant domain diameter, the selection of a channel for propagation of a domain at an intersection between channels may be made to depend on the domain diameter at the intersection.

Figure 7:
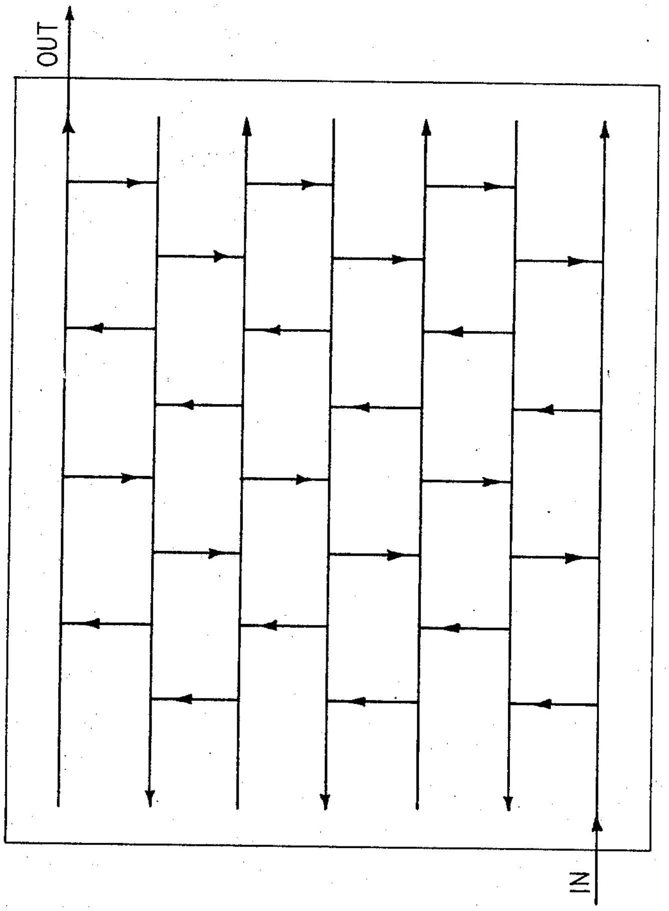
FIG. 7 is a schematic illustration of a channel arrangement which permits two-dimensional flow of information.

Fanout in accordance with this invention along with fan-in at various interconnected intersections, whether achieved with an expand-contract mode of domain propagation or with a constant diameter mode, permits a flow of information in two dimensions in a magnetic sheet such as sheet 11 of FIG. 1. FIG. 7 shows a schematic of interconnected channels which permits such an information flow. Each channel is represented by a line accompanied by an arrow indicating the direction of information flow. The horizontal lines are alternately directed to the right and to the left as viewed in the figure. The vertical lines are arranged in offset pairs. The first pair and third pair from the left are directed upward; the second and fourth pairs are directed downward. Information introduced at an input point at the bottom left of FIG. 7 may be selectively rearranged before proceeding to the output point in the upper right thereby permitting familiar information processing operations in accordance with the discussion in connection with FIG. 1.

What has been described is considered only illustrative of the principles of this invention. Consequently, various other arrangements can be devised by one skilled in the art in accordance with these principles without departing from the spirit and scope of the invention.

What is claimed is:

1. A magnetic domain propagation arrangement comprising a sheet of magnetic material in which a single wall domain can be propagated, means for providing in said sheet a bias field for controlling the size of said single wall domain therein, means for defining in said sheet first and second domain propagation channels for said single wall domain and a first intersection therebetween, means for propagating said single wall domain in said first and second channels, and means for selecting for said single wall domain at said intersection said first or second channel for propagation, said last-mentioned means comprising control means for controllably changing said bias field to change the size of said single wall domain at said first intersection.

2. An arrangement in accordance with claim 1 also including means for introducing a single wall domain into said first channel.

3. An arrangement in accordance with claim 2 also including means for detecting the presence of a single wall domain in said second channel.

4. An arrangement in accordance with claim 3 wherein said control means comprises means coupled locally to said sheet at said intersection for controlling the size of said domain there.

5. An arrangement in accordance with claim 3 wherein said means for defining in said sheet first and second propagation channels comprises an overlay of magnetic material having a repetitive asymmetric geometry to cause a net displacement therealong in response to an alternate expansion and contraction of domain size, and means for alternately expanding and contracting domains in said sheet.

6. An arrangement in accordance with claim 3 wherein said means for defining in said sheet first and second propagation channels comprises overlays of magnetic material having a repetitive geometry for providing domain propagation therealong in response to a rotating transverse field, and means generating a transverse field rotating in the plane of said sheet.

7. An arrangement in accordance with claim 5 wherein said channels are unidirectional.

8. An arrangement in accordance with claim 6 wherein said first and second propagation channels comprise overlays having geometries to support relatively weak and relatively strong pole concentrations respectively.

9. An arrangement in accordance with claim 8 wherein said first channel comprises a Permalloy disk and said second channel comprises T-bar Permalloy geometries arranged radially with respect to said disk.

10. An arrangement in accordance with claim 7 wherein the first portion of said repetitive overlay pattern in said second channel at said intersection is relatively thin.

11. A magnetic domain propagation arrangement comprising a sheet of magnetic material in which single wall domains can be propagated, means for defining in said sheet a plurality of propagation channels for single wall domains and intersections therebetween, means for selectively providing single wall domains at input positions in said channels, means for propagating single wall domains in said channels, means for detecting the presence and absence of single wall domains at output positions in said channels, means for providing in said sheet a substantially uniform bias field for controlling the size of single wall domains therein, and means for selecting an exit channel for a domain at each of said intersections, said last-mentioned means comprising control means for controllably changing the size of said single wall domain at each of said intersections.

References Cited

UNITED STATES PATENTS

| | | | |
|---|---|---|---|
| 3,172,089 | 3/1965 | Broadbent | 340—174 |
| 3,191,054 | 6/1965 | Ghisler et al. | 307—88 |

STANLEY M. URYNOWICZ, Jr., Primary Examiner